United States Patent
Zhong et al.

(10) Patent No.: US 8,110,021 B2
(45) Date of Patent: Feb. 7, 2012

(54) SYNTHESIS OF PTCO NANOPARTICLES

(75) Inventors: Chuan-Jian Zhong, Johnson City, NY (US); Jin Luo, Vestal, NY (US); Zhichaun Xu, Binghamton, NY (US); Ting He, Dublin, OH (US)

(73) Assignees: Honda Motor Co., Ltd., Tokyo (JP); The Research Foundation of the State University of New York, Binghamton, NY (US)

( * ) Notice: Subject to any disclaimer, the term of this patent is extended or adjusted under 35 U.S.C. 154(b) by 445 days.

(21) Appl. No.: 12/359,494

(22) Filed: Jan. 26, 2009

(65) Prior Publication Data

US 2010/0018346 A1    Jan. 28, 2010

Related U.S. Application Data

(60) Provisional application No. 61/083,989, filed on Jul. 28, 2008.

(51) Int. Cl.
   *B22F 9/18*    (2006.01)
(52) U.S. Cl. .............................. 75/351; 75/371; 977/896
(58) Field of Classification Search .................. None
   See application file for complete search history.

(56) References Cited

U.S. PATENT DOCUMENTS

| | | | |
|---|---|---|---|
| 6,262,129 B1 | 7/2001 | Murray et al. | |
| 6,861,387 B2 | 3/2005 | Ruth et al. | |
| 6,875,253 B2 | 4/2005 | Daimon et al. | |
| 6,878,445 B2 * | 4/2005 | Hattori et al. | 428/402 |
| 7,175,778 B1 | 2/2007 | Bhargava et al. | |
| 7,208,439 B2 | 4/2007 | Zhong et al. | |
| 7,288,134 B2 | 10/2007 | Sun et al. | |
| 7,931,730 B2 * | 4/2011 | Lee et al. | 75/371 |
| 7,935,170 B2 * | 5/2011 | Jun et al. | 75/373 |
| 2003/0039860 A1 | 2/2003 | Cheon et al. | |
| 2003/0157371 A1 * | 8/2003 | Ihara et al. | 428/694 BA |
| 2005/0235776 A1 * | 10/2005 | He et al. | 75/255 |
| 2006/0177660 A1 | 8/2006 | Kumar et al. | |
| 2007/0190399 A1 | 8/2007 | Barbaro et al. | |
| 2007/0259251 A1 | 11/2007 | He et al. | |
| 2008/0096093 A1 | 4/2008 | Jang et al. | |
| 2008/0113257 A1 | 5/2008 | Hampden-Smith et al. | |
| 2008/0134836 A1 | 6/2008 | Brooks et al. | |

(Continued)

OTHER PUBLICATIONS

Zhang, X., Tsang, K-Y., Chan, K-Y., "Electrocatalytic properties of supported platinum-cobalt nanoparticles with uniform and controlled composition," J. Electroanalytical Chem., vol. 573 (2004), pp. 1-9, Elsevier B.V.

(Continued)

*Primary Examiner* — George Wyszomierski
(74) *Attorney, Agent, or Firm* — Capitol City TechLaw, PLLC; Mark E. Duell (57) ABSTRACT

Synthesis of nanoparticles with particle size control is provided by the method of using two different metal-containing precursors, a capping component, an optional reducing agent, and then contacting the two precursors with the capping component to form a reaction solution, which is heated to produce first and second metals-containing nanoparticles. By controlling the ratio of the concentration of the capping component to the total concentration of the two metal-containing precursors, the nanoparticles can have diameters ranging between about 1 nm to about 15 nm. A decrease in the concentration of the capping component typically increases the size of the nanoparticles. Preferred compositions include Pt and Co-containing alloy nanoparticles. Controlled synthesis of larger, about 6 nm to about 12 nm, sized nanoparticles can be achieved in a solvent-free reaction process.

12 Claims, 9 Drawing Sheets

U.S. PATENT DOCUMENTS

2010/0227189 A1* 9/2010 Shumaker-Parry et al. .. 428/570
2010/0266478 A1 10/2010 Kim et al.
2010/0316554 A1* 12/2010 Hernandez et al. ........... 423/414

OTHER PUBLICATIONS

Sun, Shouheng, Murray, C.B., Weller, D., Folks, L., and Moser, A., "Monodisperse FePt Nanoparticles and Ferromagnetic FePt Nanocrystal Superlattices" Science, vol. 287, (Mar. 2000), pp. 1989-1992, American Association for the Advancement of Science, NY, NY.

Liu, Z., Yu, C.., Rusakova, I., Huang, D., and Strasser, P.; "Synthesis of Pt3Co Alloy Nanocatalyst via Reverse Micelle for Oxygen Reduction Reaction in PEMFCs," Topics in Catalysis, vol. 49, No. 3-4, pp. 241-250, Kluwer Academic Publishers-Plenum Publishers, NE., May 30, 2008.

International Search Report mailed Nov. 4, 2009 for PCT/US2009/051615.

* cited by examiner

SYNTHESIS OF PTCO NANOPARTICLES

CROSS-REFERENCE TO RELATED APPLICATIONS

The present application claims benefit from earlier filed U.S. Provisional Patent Application No. 61/083,989, filed Jul. 28, 2008, which is incorporated herein in its entirety by reference for all purposes.

BACKGROUND

1. Field of the Invention

The present teachings relate to PtCo alloy nanoparticles and methods to synthesize the nanoparticles with control over the particle size distribution, dispersion and particle composition.

2. Discussion of the Related Art

Benchmark Pt catalysts used in the cathode of low temperature fuel cells exhibit high cost, low activity and poor durability, which are some of the major barriers to commercialization of this type of fuel cell technology. Alloy catalysts have the potential to enhance catalytic activity as well as improve durability. Among alloy catalyst compositions, PtCo alloy catalysts have shown recent promise in the laboratory.

Use of Pt alloy nanoparticles that can increase the catalytic activity and reduce the amount of Pt required is also one of the possible approaches to achieve the same level of cathode performance with a reduced amount of precious metal. Difficulty in controlling the particle size, distribution and compositional uniformity of the nanoparticles are concerns with alloy nanoparticle preparation schemes.

A need exists, therefore, for synthesis methods to produce alloy nanoparticles with the desired controllable size distribution, dispersion, and composition characteristics.

SUMMARY

The present teachings satisfy the need for synthesis methods for alloy nanoparticles, specifically for alloy nanoparticles comprising Pt and Co.

The present teachings include a method of preparing alloy nanoparticles which method includes preparing Pt and Co-containing nanoparticles by providing a Pt-containing precursor, a Co-containing precursor, and at least one capping component, then contacting the two precursors together with the at least one capping component in a solvent system to form a Pt and Co-containing reaction solution. Optionally, a separate reducing agent can be added to the reaction solution, or the at least one capping component can also function as a reducing agent. The reaction solution can then be heated to produce Pt and Co-containing alloy nanoparticles ranging in diameter from about 1 nm to about 5 nm. For the various embodiments of the present method, the size of the Pt and Co-containing alloy nanoparticles can be controlled by the ratio of concentration of the capping component to the total concentration of both the Pt-containing and the Co-containing precursors, and a decrease in the concentration of the capping component increases the diameter of the Pt and Co-containing nanoparticles.

The present teachings further include a solvent-free method of preparing Pt and Co-containing nanoparticles by providing a Pt-containing precursor, a Co-containing precursor, and at least one capping component. Optionally, a separate reducing agent can be added to the reaction solution, or the at least one capping component can also function as a reducing agent. The two precursors can then be contacted together with the at least one capping component in a solvent-free system to form a Pt and Co-containing reaction solution, which can be heated to produce Pt and Co-containing nanoparticles ranging in diameter from about 6 nm to about 12 nm, and in some cases up to about 15 nm. In this further disclosed solvent-free method, the size of the Pt and Co-containing nanoparticles can be controlled by the overall concentration of the Pt-containing precursor and the Co-containing precursor, and an increase in the overall concentration of the Pt-containing precursor and the Co-containing precursor increases the diameter of the Pt and Co-containing nanoparticles.

A typical synthesis procedure for the Pt and Co-containing nanoparticles is set forth below:

$$Pt(II)(acac)_2 + Co(0)(CO)_8 \rightarrow Pt_x(0)Co_{1-x}(0)$$

where the reaction occurs in the presence of a capping component, such as, oleylamine and/or oleic acid, and a reducing agent, such as 1,2-hexadecanediol, and is heated to produce the metal-containing nanoparticles. In some cases, the metal precursors can have the same or different non-metallic moieties coordinated thereto, for instance both metal precursors can be the acetylacetonate-coordinate complexes.

The methods of the present teachings also include a method of controlling the size of nanoparticles produced during a synthesis reaction including the steps of providing a first metal-containing precursor, a second metal-containing precursor, and at least one capping component, contacting the two precursors together with the at least one capping component to form a first metal- and a second metal-containing reaction solution, then heating the reaction solution to produce first and second metals-containing nanoparticles, and finally controlling the ratio of the concentration of the capping component to the total concentration of both the first metal-containing and the second metal-containing precursors. In this disclosed method the nanoparticles can have diameters ranging between about 1 nm to about 12 nm.

BRIEF DESCRIPTION OF THE FIGURES

The accompanying figures, which are included to provide a further understanding of the present teachings and are incorporated in and constitute a part of this specification, illustrate various embodiments of the present teachings and together with the detailed description serve to explain the principles of the present teachings. In the figures.

DETAILED DESCRIPTION

The present teachings relate to methods of preparing monodispersed alloy nanoparticles having controllable compositions and sizes, between about 1 nm and about 15 nm; preferably the methods can be directed to the preparation of Pt- and Co-containing nanoparticles.

The present disclosure includes a method of preparing Pt and Co-containing nanoparticles by providing a Pt-containing precursor, a Co-containing precursor, and at least one capping component, then contacting the two precursors together with the at least one capping component in a solvent system to form a Pt and Co-containing reaction solution, and next heating the reaction solution to produce Pt and Co-containing nanoparticles ranging in diameter from about 1 nm to about 5 nm. Optionally, a separate reducing agent can be added to the reaction solution, or the at least one capping component can also function as a reducing agent. For this present method, the size of the Pt and Co-containing nanoparticles is controlled by the ratio of concentration of the capping component to the total concentration of both the Pt-containing and the Co-containing precursors, and a decrease in the concentration of the capping component increases the diameter of the Pt and Co-containing nanoparticles.

The presently taught method can be utilized to produce Pt and Co-containing nanoparticles having between about 20 atomic percent to about 90 atomic percent Pt present, and in some additional embodiments, the Pt and Co-containing nanoparticles can include nanoparticles composed of about 75 atomic percent Pt and about 25 atomic percent Co.

The solvent system for the present method can include at least one component selected from the group consisting of an ether, octyl ether, benzyl ether, toluene, tetrahydrofuran, hexane, propanol, water, 1-butanol, diphenylmethane, phenyl ether, ethanol, ethylenediamine, and combinations thereof.

The capping component utilized in the present method includes at least one member selected from the group consisting of oleic acid, oleylamine, a thiol, a polyacrylic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof. And preferably, the capping component includes at least one member selected from the group consisting of oleic acid, oleylamine, and combinations thereof.

The present disclosure also includes a method of preparing Pt and Co-containing nanoparticles ranging in diameter from about 6 nm to about 12 nm by providing a Pt-containing precursor, a Co-containing precursor, and at least one capping component. The two precursors are contacted together with the at least one capping component in a solvent-free system to form a Pt and Co-containing reaction solution. The reaction solution is then heated to produce Pt and Co-containing nanoparticles. In the presently disclosed method, the size of the Pt and Co-containing nanoparticles is controlled by the overall concentration of the Pt-containing precursor and the Co-containing precursor, and an increase in the overall concentration of the Pt-containing precursor and the Co-containing precursor increases the diameter of the Pt and Co-containing nanoparticles.

The Pt and Co-containing nanoparticles produced by the present method can contain between about 20 atomic percent to about 90 atomic percent Pt, and in some instances, can contain about 75 atomic percent Pt and about 25 atomic percent Co.

The capping component utilized in the presently disclosed method can include at least one member selected from the group consisting of oleic acid, oleylamine, a thiol, a polyacrylic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof.

Of particular interest for the present method is the use of oleic acid, oleylamine, and combinations thereof as the capping component.

A method of controlling the size of nanoparticles having diameters ranging between about 1 nm to about 12 nm, and produced during a synthesis reaction is also presented by the present application. This method includes the steps of providing a first metal-containing precursor, a second metal-containing precursor, and at least one capping component, contacting the two precursors together with the at least one capping component to form a first metal- and a second metal-containing reaction solution, heating the reaction solution to produce first and second metals-containing nanoparticles, and controlling the ratio of the concentration of the capping component to the total concentration of both the first metal-containing and the second metal-containing precursors. This method can also be utilized to produce nanoparticles having, in some instances, diameters ranging from about 1 nm up to about 15 nm.

A decrease in the concentration of the capping component increases the diameter of the first and second metals-containing nanoparticles for the presently disclosed method of nanoparticle size control. For nanoparticles ranging in diameter from about 1 nm to about 5 nm, the process of contacting the two precursors can occur within a solvent system, while for nanoparticles ranging in diameter from about 6 nm to about 12 nm, the contacting step occurs without any solvent present.

Where a solvent system is used, such a solvent system can include at least one component selected from the group consisting of an ether, octyl ether, benzyl ether, toluene, tetrahydrofuran, hexane, propanol, water, 1-butanol, diphenylmethane, phenyl ether, ethanol, ethylenediamine, and combinations thereof.

The capping components utilized in the presently disclosed method can include at least one member selected from the group consisting of oleic acid, oleylamine, a thiol, a polyacrylic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof.

Of particular interest is the use of a capping component which includes at least one member selected from the group consisting of oleic acid, oleylamine, and combinations thereof. This capping component can also function as a reducing agent, or in other embodiments of the present teachings, an optional separate reducing agent can be added to the reaction solution. One suitable reducing agent can be 1,2-hexadecanediol, for example.

The method presently disclosed is particularly suited for preparations with the first metal including platinum, and the second metal including cobalt. The Pt and Co-containing nanoparticles can be composed of between about 20 atomic percent to about 90 atomic percent Pt, and in some cases, can be composed of about 75 percent Pt and about 25 percent Co.

For the synthesis method involving solvent, as exemplified in Examples 1 and 2, the size of nanoparticles is believed to be controlled, or at least, influenced, by two factors. One factor is the metal precursor concentration and the other is the capping agent concentration. An increase in metal precursor concentration, typically results in a size increase of the nanoparticles produced. At a higher overall metal precursor concentration, the nanoparticles can typically grow into larger-sized particles. Decreasing the capping agent concentration is seen to lead to a nanoparticle size increase. Reducing the concentration of capping agent in the reaction solution is believed to result in an insufficient capping effect on the nanoparticles, which allows more metal-containing precursors to reach and then grow on the nanoparticle surface. This solvent-based synthesis method is favored for producing about 1 nm to about 5 nm sized nanoparticles, especially bimetallic nanoparticles, particularly PtCo-containing nanoparticles.

While the non-solvent process, illustrated in Example 3, is also viable for synthesizing small sized nanoparticles, the present results have shown that it is more suited for producing larger-sized PtCo nanoparticles. This method controls the size of the nanoparticles produced by changing either or both of metal precursor concentration and reaction temperature. A higher metal precursor concentration results in larger bigger sized nanoparticles being produced. It has also been seen that a higher reaction temperature can also produce larger sized nanoparticles. The nanoparticle size range produced by this non-solvent method can range from about 6 nm to about 12 nm in diameter.

According to the numerous embodiments of the presently taught methods, the metal-containing precursors can also include a metal-containing complex having one or more non-metallic moieties coordinated thereto and selected from the group consisting of, for example, hydroxyls, amines, carbonyls, nitrates, oxides, acetylacetonates, halides, chlorides, alkyl-containing moieties, alkoxy-containing moieties, aryl-containing moieties, nitrosyl-containing moieties, and combinations thereof.

According to variously taught methods, the metal-containing precursors can include a metal-containing complex containing at least one metal selected from the group consisting of, for example, titanium, zirconium, vanadium, tantalum, chromium, molybdenum, tungsten, manganese, rhenium, iron, ruthenium, osmium, cobalt, rhodium, iridium, nickel, palladium, platinum, copper, tin, and selenium.

According to the various presently taught methods, the reducing agent can include one or more of sodium borohydride, 1,2-hexadecanediol, oleylamine, trimethylaluminum, super hydride, hydrazine monohydrate, and combinations thereof. Of particular interest are various diols or polyalcohols, especially those having longer carbon chains, with 1,2-hexadecanediol being particularly well suited for the present synthetic processes.

According to various embodiments of the present teachings, the metal nanoparticles can be contacted with a support material to form supported metal nanoparticles. The support material can be a high surface area support material, including support material with surface areas of at least about 200 $m^2/g$, of at least about 400 $m^2/g$, of at least about 600 $m^2/g$, of at least about 800 $m^2/g$, and of at least about 1000 $m^2/g$. The support material can include one or more of carbon or inorganic materials. According to various embodiments of the present teachings, the support material can be carbon black, carbon fiber, or carbon nanotube.

All publications, articles, papers, patents, patent publications, and other references cited herein are hereby incorporated herein in their entireties for all purposes.

Although the foregoing description is directed to the preferred embodiments of the present teachings, it is noted that other variations and modifications will be apparent to those skilled in the art, and which may be made without departing from the spirit or scope of the present teachings.

The following examples are presented to provide a more complete understanding of the present teachings. The specific techniques, conditions, materials, and reported data set forth to illustrate the principles of the present teachings are exemplary and should not be construed as limiting the scope of the present teachings.

EXAMPLES

Electron Microscopic Images

Transmission electron microscopy images, as presented in FIGS. 3 through 7, were obtained on commercially available TEM instruments, such as those available from Hitachi (Tokyo, Japan) and JEOL (Tokyo, Japan). Particle size measurements and distribution results were obtained by well known analysis techniques from the TEM images.

DCP-AES Measurements

Figure 1:
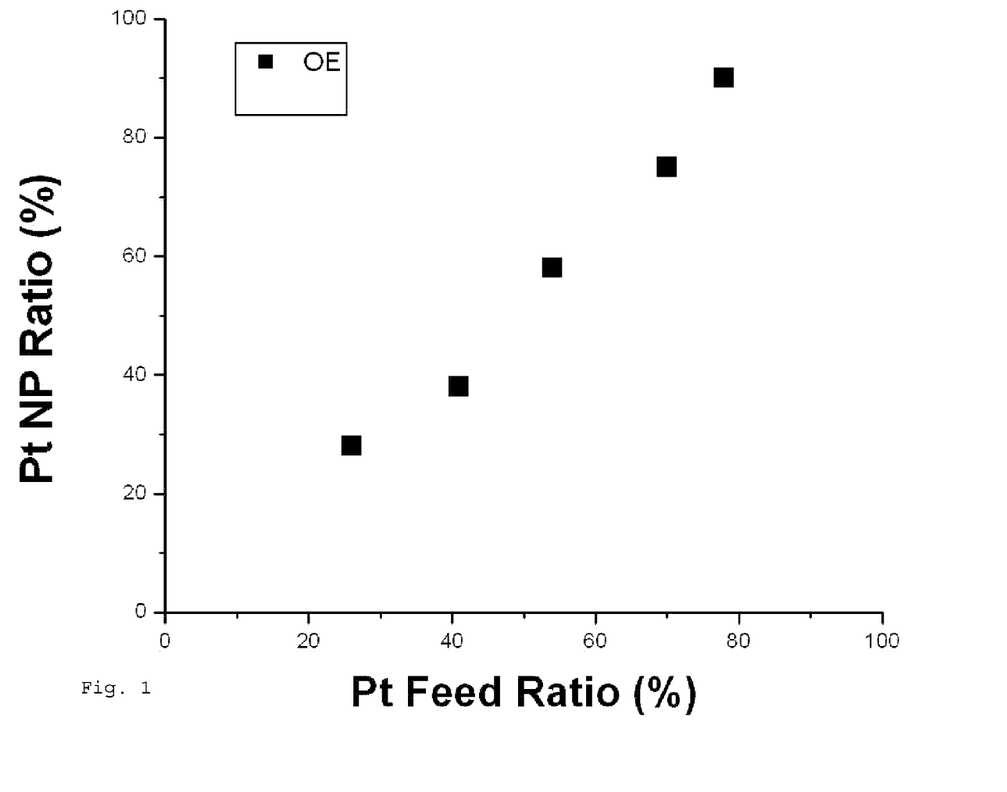
FIG. 1 is a graph of the relative Pt concentration in the nanoparticle product versus that in the synthetic reaction solution in octyl ether.
Figure 2:
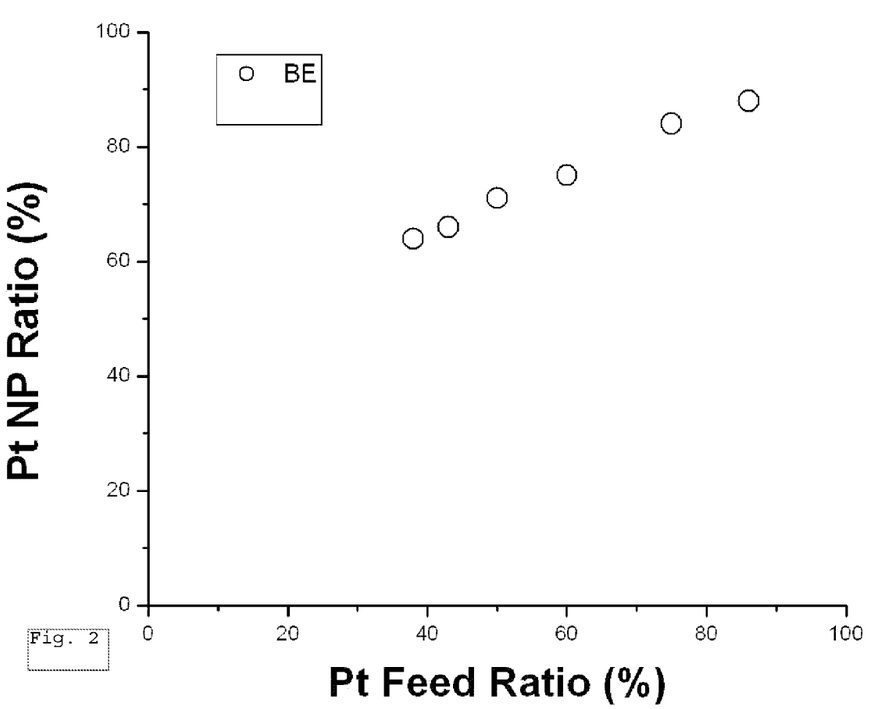
FIG. 2 is a graph of the relative Pt concentration in the nanoparticle product versus that in the synthetic reaction solution in benzyl ether.

The composition analysis presented in FIGS. 1 and 2 were performed by DCP-AES (Direct Current Plasma-Atomic Emission Spectrometry). DCP-AES analyses were performed on samples prepared according to standard techniques. Measurement techniques similar to those presented in the ASTM E1097-07 standard guide for DCP-AES analysis can be utilized to acquire suitable data for the purposes of the teachings of the present disclosure.

Example 1

Synthesis of 2-nm $Pt_{75}Co_{25}$

To a 250 ml 3-neck flask containing 60 mL octyl ether (99%) were added 543 mg 1,2-hexadecanediol (1.89 mmol) and 275 mg platinum acetylacetonate $Pt(acac)_2$ (0.68 mmol) while stirring. The solution was purged with nitrogen and heated to 105° C. The solution appeared dark green color. A separate solution containing 103 mg $Co_2(CO)_8$ (0.30 mmol) dissolved in 3 mL octyl ether was prepared.

At this 105° C. temperature and under nitrogen atmosphere, 0.5 mL oleylamine (1.06 mmol), 0.5 mL oleic acid (1.56 mmol), and the solution containing $Co_2(CO)_8$ prepared above were added to the heated solution. Nitrogen purging was stopped and the solution was kept under nitrogen. The mixture was heated to 270° C., and kept at 270° C. for 30 minutes. The solution turned black in color.

After the reaction mixture was allowed to cool down to room temperature, the solution was transferred into a large flask under ambient environment. The black product was precipitated by adding ethanol (about 300 ml). The complete precipitation was achieved either by overnight precipitation or by centrifugation. The yellow-brown supernatant was discarded.

The black precipitate was dispersed in hexane (about 100 ml) in the presence of oleic acid (about 0.2 ml) and oleylamine (about 0.2 ml) and precipitated out by adding ethanol (about 300 ml) and centrifuging. The product was re-dispersed in hexane (about 100 ml), centrifuged to remove any unsolved precipitation, precipitated out by adding ethanol (about 300 ml) and centrifuging, and dried under nitrogen.

The nanoparticle product was dispersed in hexane and stored under nitrogen.

Example 2

Synthesis of 5-nm $Pt_{75}CO_{25}$

In a 100 ml 3-neck flask containing 40 ml octyl ether, 600 mg platinum acetylacetonate (3.0 mmol), 0.2 ml oleylamine (0.5 mmol) and 0.16 ml oleic acid (0.5 mmol) were added into the octyl ether solution under stirring. The solution was purged with nitrogen and heated to 100° C. The solution appeared yellowish color.

At temperature and under nitrogen atmosphere, 171 mg $CO_2(CO)_8$ (0.5 mmol) were added into the octyl ether solution. The solution was kept under nitrogen. The mixture was heated to 270° C., and refluxed for 2 hours. The solution appeared black in color.

After the reaction mixture was allowed to cool down to room temperature, the solution was transferred into a large flask under ambient environment. The black product was precipitated by adding ethanol (about 200 ml). The complete precipitation was achieved either by overnight precipitation or by centrifugation. The yellow-brown supernatant was discarded. The black precipitate was dispersed in hexane (about 60 ml) in the presence of oleic acid (about 0.1 ml) and oleylamine (about 0.1 ml) and precipitated out by adding ethanol (about 200 ml) and centrifuging. The product was re-dispersed in hexane (about 60 ml), centrifuged to remove any unsolved precipitation, precipitated out by adding ethanol (about 200 ml) and centrifuging, and dried under nitrogen.

The nanoparticle product was either stored as powder or re-dispersed in hexane and stored under nitrogen.

Example 3

Synthesis of 8-nm $Pt_{75}CO_{25}$

In a 100 ml 3-neck flask containing 20 ml oleylamine and 14 ml oleic acid, 600 mg platinum acetylacetonate (3.0 mmol) and 129 mg cobalt(II) acetylacetonate (0.25 mmol) were added into the above solution under stirring. The solution was purged with nitrogen and heated to 250° C. The solution appeared black in color.

After the reaction mixture was allowed to cool down to room temperature, the solution was transferred into a large flask under ambient environment. The black product was precipitated by adding ethanol (about 100 ml). The complete precipitation was achieved either by overnight precipitation or by centrifugation. The yellow-brown supernatant was discarded. The black precipitate was dispersed in hexane (about 10 ml) in the presence of oleic acid (about 0.1 ml) and oleylamine (about 0.1 ml) and precipitated out by adding ethanol (about 100 ml) and centrifuging. The product was re-dispersed in hexane (about 10 ml), centrifuged to remove any unsolved precipitation, precipitated out by adding ethanol (about 100 ml) and centrifuging, and dried under nitrogen.

The nanoparticle product was either stored as powder or re-dispersed in hexane and stored under nitrogen.

Composition Analysis of PtCo Nanoparticles of Varying Compositions

A series of PtCo nanoparticles at different reactant feed ratios was prepared in both octyl ether and benzyl ether and the data are listed in Tables 1 and 2. The relative metal compositions in the nanoparticles are compared with the synthetic feed ratios, as shown in FIGS. 1 and 2.

The data shows that generally the relative composition of Pt in the nanoparticle product scales approximately linearly with the feed composition in the synthetic reaction solution for both solvents.

Monodispersity Analysis of PtCo Nanoparticles of Varying Compositions

Figure 3A:
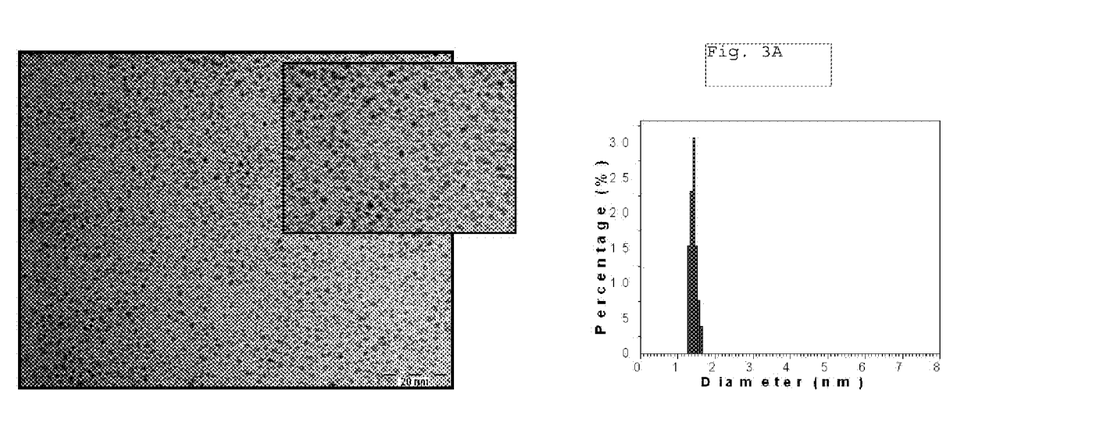
FIGS. 3A, 3B and 3C are transmission electron microscopy (hereinafter "TEM") micrographs and size distribution graphs of approximately 2 nm sized PtCo nanoparticles made according to the present teachings.
Figure 3B:
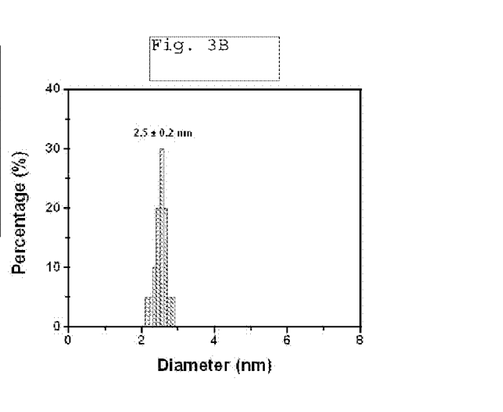
Figure 3C:
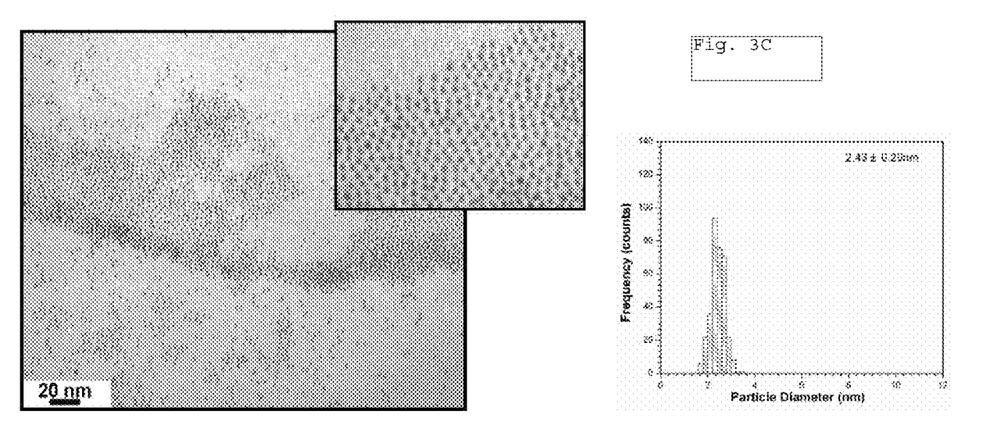
Figure 4:
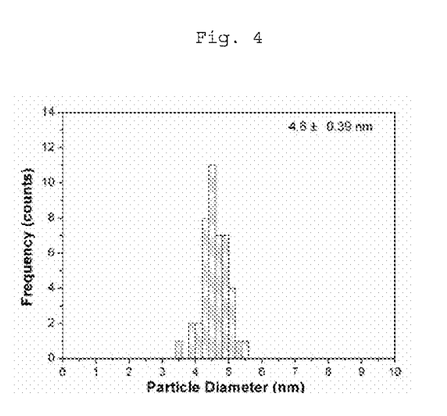
FIG. 4 are TEM micrographs and size distribution graphs of 4.6 nm sized PtCo nanoparticles made according to the present teachings.

A series of PtCo nanoparticles was prepared according to the method set forth in Example 1 above, with different Pt:Co ratios and different metal precursor and capping agent concentrations to provide a range of both Pt:Co ratio and size distributions. FIGS. 3A, B and C present both the micrographs and size distribution results for A) $Pt_{38}Co_{62}$, size: 1.5±0.2 nm; B) $Pt_{90}Co_{10}$, size: 2.5±0.2 nm; and C) $Pt_{75}CO_{25}$, size: 1.6±0.2 nm. FIG. 4 presents the micrographs and size distribution results for nanoparticles composed of $Pt_{79}CO_{21}$, size: 4.6±0.4 nm.

Figure 5:
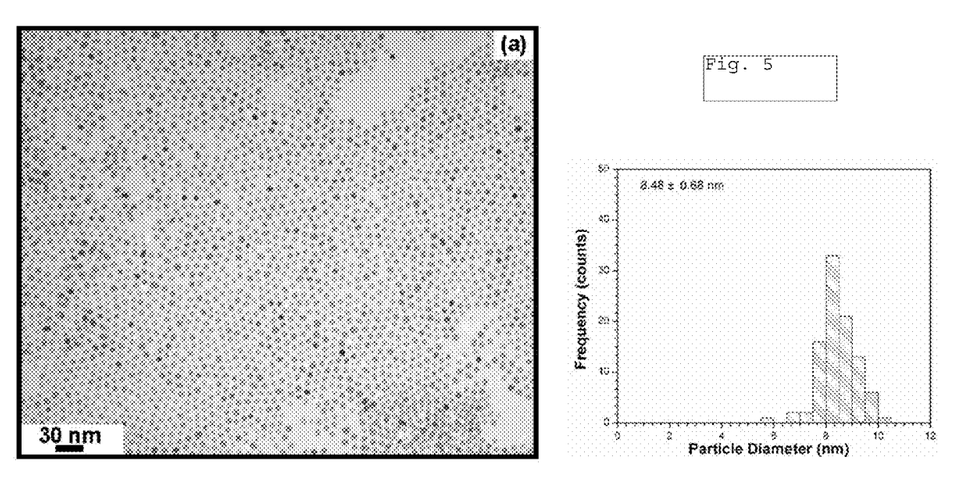
FIG. 5 are TEM micrographs and size distribution graphs of 8.5 nm sized PtCo nanoparticles made according to the present teachings.

FIG. 5 presents the micrographs and size distribution results for nanoparticles composed of $Pt_{70}CO_{30}$, size: 8.5±0.7 nm, which were prepared according to the method set forth in Example 3 above.

As set forth above, the presently taught methods can be utilized to synthesize metal-containing nanoparticles with core sizes ranging from about 1 nm to about 9 nm with relatively high monodispersity of particle size. The average standard deviation for the five samples presented above ranges from 0.2 to 0.7 nm, or only about 10% of the average size.

Assembly of PtCo Nanoparticles on Carbon Support Materials

The metal-containing nanoparticles prepared according to the teachings of the present disclosure can be supported on a variety of support materials. The exemplary assembly of PtCo nanoparticles as prepared above in Example 1 onto a high surface area carbon support is set forth below.

A suitable high surface area carbon black, 320 mg, (such as Ketjen Black ECP, Lion Corporation, Tokyo, Japan) is heated at 900° C. in nitrogen for two hours, cooled, then suspended in 300 mL hexane, and sonicated for about three hours at ambient temperature. The PtCo nanoparticles (about 80 mg $Pt_{75}CO_{25}$, average size of 2.5 nm), prepared in Example 1 above, are added into the carbon black/hexane suspension and sonicated for 30 minutes, followed by stirring for 15 hours at ambient temperature. The solvent is evaporated by purging nitrogen while stirring for four to eight hours. The remaining powder is collected and further dried under nitrogen.

Figure 6:
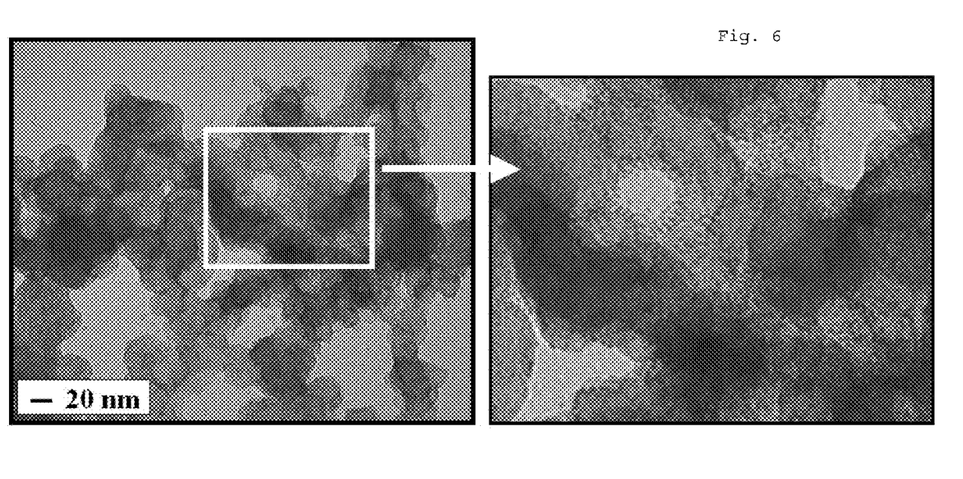
FIG. 6 are TEM micrographs of PtCo nanoparticles made according to the present teachings supported on carbon.
Figure 7:
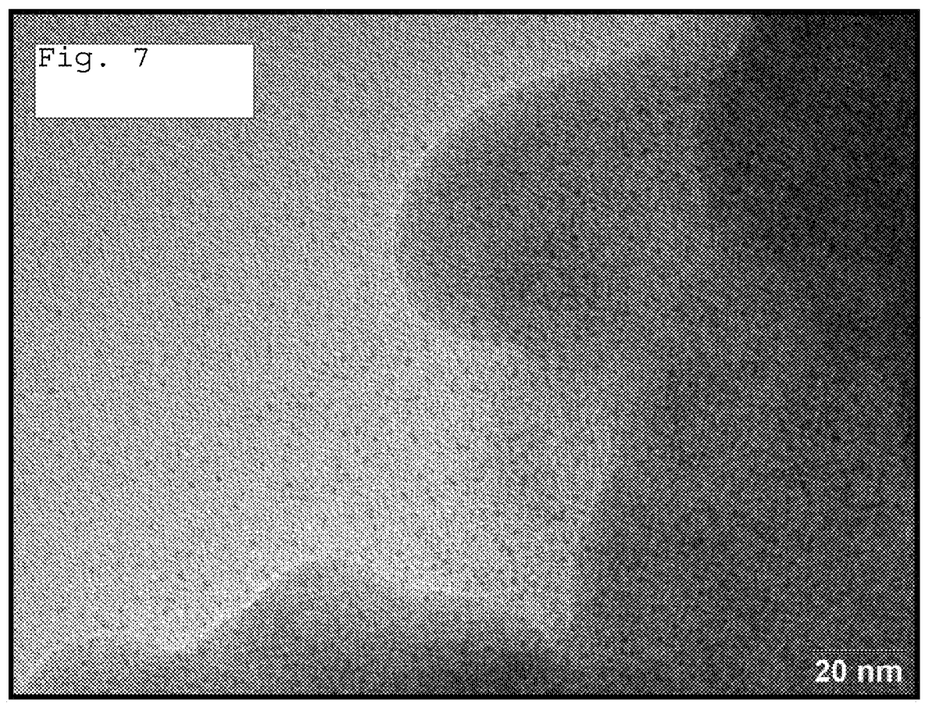
FIG. 7 is a TEM micrograph of PtCo nanoparticles made according to the present teachings supported on carbon.

FIG. 6 provides a TEM micrograph of the carbon supported PtCo powder prepared above at a calculated loading of about 20%, and FIG. 7 shows carbon-supported nanoparticles consisting of $Pt_{81}Co_{19}$, with an average size of 2.5 nm at a calculated loading of about 33%.

The particle sizes for both samples were basically unaffected by the process of supporting on the carbon materials.

The foregoing detailed description of the various embodiments of the present teachings has been provided for the purposes of illustration and description. It is not intended to be exhaustive or to limit the present teachings to the precise embodiments disclosed. Many modifications and variations will be apparent to practitioners skilled in this art. The embodiments were chosen and described in order to best explain the principles of the present teachings and their practical application, thereby enabling others skilled in the art to understand the present teachings for various embodiments and with various modifications as are suited to the particular use contemplated. It is intended that the scope of the present teachings be defined by the following claims and their equivalents.

TABLE 1

Octyl Ether Solvent

| Feed Ratio | Product Composition |
|---|---|
| Pt—26 Co—74 | Pt—28 Co—72 |
| Pt—41 Co—59 | Pt—38 Co—62 |
| Pt—54 Co—46 | Pt—58 Co—42 |
| Pt—70 Co—30 | Pt—75 Co—25 |
| Pt—78 Co—22 | Pt—90 Co—10 |

TABLE 2

Benzyl Ether Solvent

| Feed Ratio | Product Composition |
|---|---|
| Pt—38 Co—62 | Pt—64 Co—36 |
| Pt—43 Co—57 | Pt—66 Co—34 |
| Pt—50 Co—50 | Pt—71 Co—29 |
| Pt—60 Co—40 | Pt—75 Co—25 |
| Pt—75 Co—25 | Pt—84 Co—16 |
| Pt—86 Co—14 | Pt—88 Co—12 |

What we claim is:

1. A method of preparing Pt and Co-containing nanoparticles comprising
   providing a Pt-containing precursor;
   providing a Co-containing precursor;
   providing at least one capping component;
   optionally, providing a reducing agent;
   contacting the two precursors together with the at least one capping component in a solvent-free system to form a Pt and Co-containing reaction mixture;
   heating the reaction mixture; and
   producing Pt and Co-containing nanoparticles ranging in diameter from about 6 nm to about 12 nm;
   wherein the size of the Pt and Co-containing nanoparticles is controlled by the overall concentration of the Pt-containing precursor and the Co-containing precursor,
   wherein an increase in the overall concentration of the Pt-containing precursor and the Co-containing precursor increases the diameter of the Pt and Co-containing nanoparticles.

2. The method according to claim 1, wherein the Pt and Co-containing nanoparticles comprise between about 20 atomic percent to about 90 atomic percent Pt.

3. The method according to claim 1, wherein the Pt and Co-containing nanoparticles comprise about 75 atomic percent Pt and about 25 atomic percent Co.

4. The method according to claim 1, wherein the capping component comprises at least one member selected from the group consisting of oleic acid, oleylamine, a thiol, a polyacrylic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof.

5. The method according to claim 1, wherein the capping component comprises at least one member selected from the group consisting of oleic acid, oleylamine, and combinations thereof.

6. A method of controlling the size of nanoparticles produced during a synthesis reaction comprising:
   providing a first metal-containing precursor;
   providing a second metal-containing precursor;
   providing at least one capping component;
   optionally, providing a reducing agent;
   contacting the two precursors together with the at least one capping component without any solvent present to form a first metal- and a second metal-containing reaction mixture;
   heating the reaction mixture;
   producing first and second metals-containing nanoparticles, and
   controlling the ratio of the concentration of the capping component to the total concentration of both the first metal-containing and the second metal-containing precursors;
   wherein the nanoparticles have diameters ranging between about 6 nm to about 12 nm.

7. The method according to claim 6, wherein a decrease in the concentration of the capping component increases the diameter of the first and second metals-containing nanoparticles.

8. The method according to claim 6, wherein the capping component comprises at least one member selected from the group consisting of oleic acid, oleylamine, a thiol, a polyacrylic acid, trimethylaluminum, tetraoctylammonium halide, tetraoctylammonium bromide, cetyltrimethylammonium halide, cetyltrimethylammonium chloride, sodium dodecyl sulfate, 2-halopropionic acid, 2-bromopropionic acid, sodium dodecylbenzenesulfonate, 3-aminopropyl-trimethyloxysilane, tetraethyl orthosilicate, poly(ethylene glycol), acetic acid, 1,10-phenanthroline, and combinations thereof.

9. The method according to claim 8, wherein the capping component comprises at least one member selected from the group consisting of oleic acid, oleylamine, and combinations thereof.

10. The method according to claim 6, wherein the first metal comprises platinum, and the second metal comprises cobalt.

11. The method according to claim 10, wherein the Pt and Co-containing nanoparticles comprise between about 20 atomic percent to about 90 atomic percent Pt.

12. The method according to claim 11, wherein the Pt and Co-containing nanoparticles comprise about 75 percent Pt and about 25 percent Co.

* * * * *